(No Model.)

3 Sheets—Sheet 1.

R. H. GARLAND.
SPRING MOTOR FOR PROPELLING VEHICLES.

No. 311,305. Patented Jan. 27, 1885.

Witnesses:

Inventor:
Richard Harrison Garland (No Model.) 3 Sheets—Sheet 2.

R. H. GARLAND.
SPRING MOTOR FOR PROPELLING VEHICLES.

No. 311,305. Patented Jan. 27, 1885.

Witnesses:

Inventor:
Richard Harrison Garland (No Model.) 3 Sheets—Sheet 3.
R. H. GARLAND.
SPRING MOTOR FOR PROPELLING VEHICLES.
No. 311,305. Patented Jan. 27, 1885.
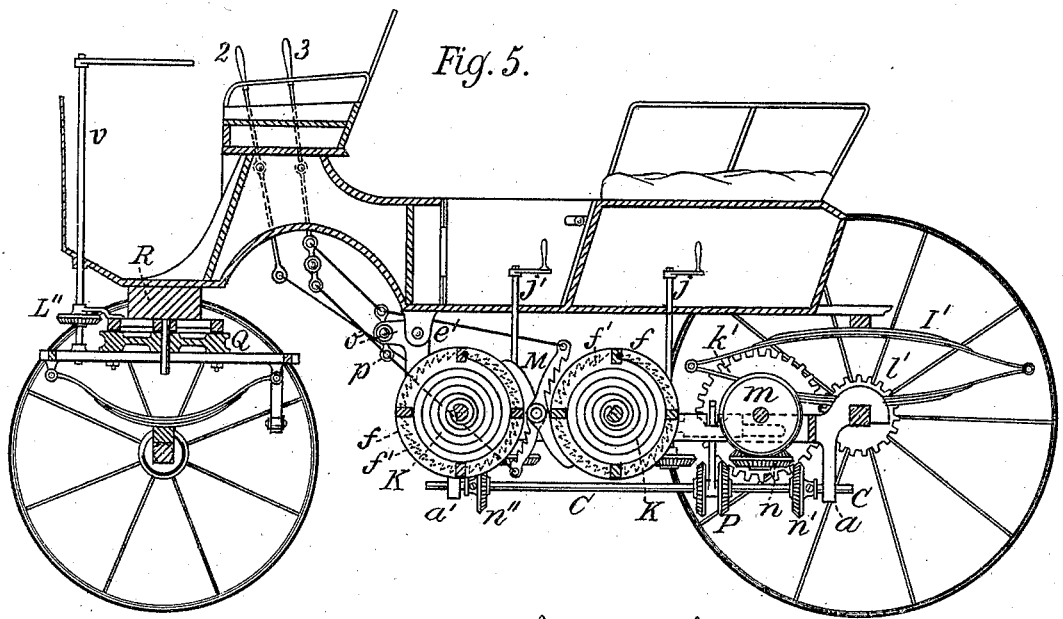
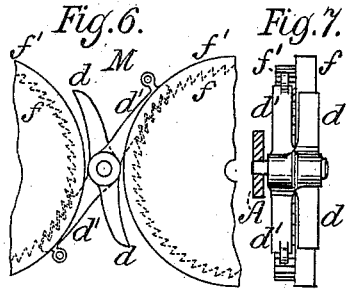
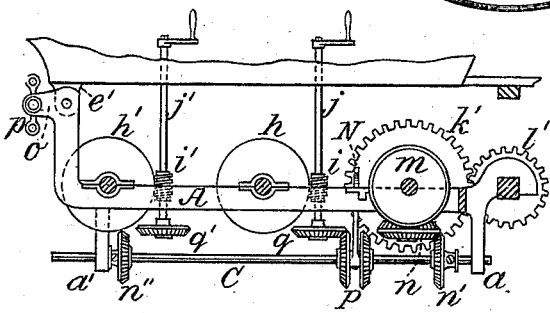
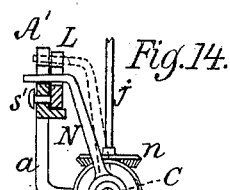
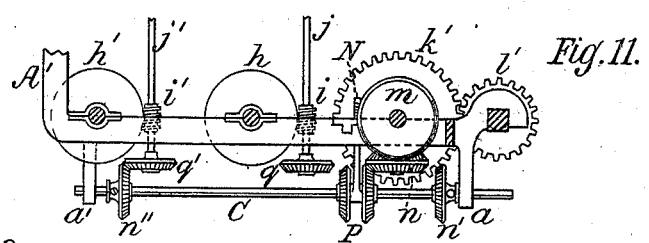
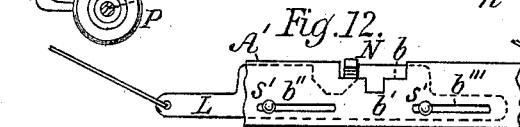
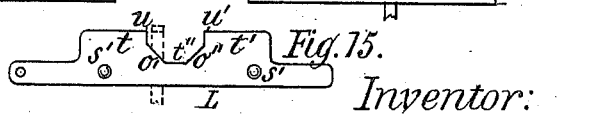
Witnesses:
W. B. Cand...
N. N. Roach
Inventor:
Richard Harrison Garland

UNITED STATES PATENT OFFICE.

RICHARD HARRISON GARLAND, OF CHICAGO, ILLINOIS.

SPRING-MOTOR FOR PROPELLING VEHICLES.

SPECIFICATION forming part of Letters Patent No. 311,305, dated January 27, 1885.

Application filed May 29, 1884. (No model.)

*To all whom it may concern:*

Be it known that I, RICHARD HARRISON GARLAND, a citizen of the United States of America, residing in Chicago, in the county of Cook and State of Illinois, have invented new and useful Improvements in Motive Power Applied for Locomotion and Propelling Vehicles of the Light Kind, of which the following is a specification.

My invention relates to a spring-motor and connected mechanical parts on an iron frame which is attachable to the body of a carriage or other light-running vehicle; and it consists of a series of steel springs of superior construction for the purpose, which are wound on the rotating axle of a revolving reel, their combined expanding force bearing upon the circumference, causing motion of the same, which is transmitted to traction-wheels for locomotion in a forward or reversed direction by intermediate mechanical arrangements, including a steering apparatus and a brake, the latter for regulating the speed, controlled by hand-levers in convenient reach of the operator. The winding up of the springs is performed by hand, to be continued automatically.

The several matters of improvement will be specifically pointed out in the claims, and may be briefly stated to consist, principally, in the construction of an iron frame supporting the apparatus and winding arrangement for locomotion in connection with vehicles.

Figure 1:
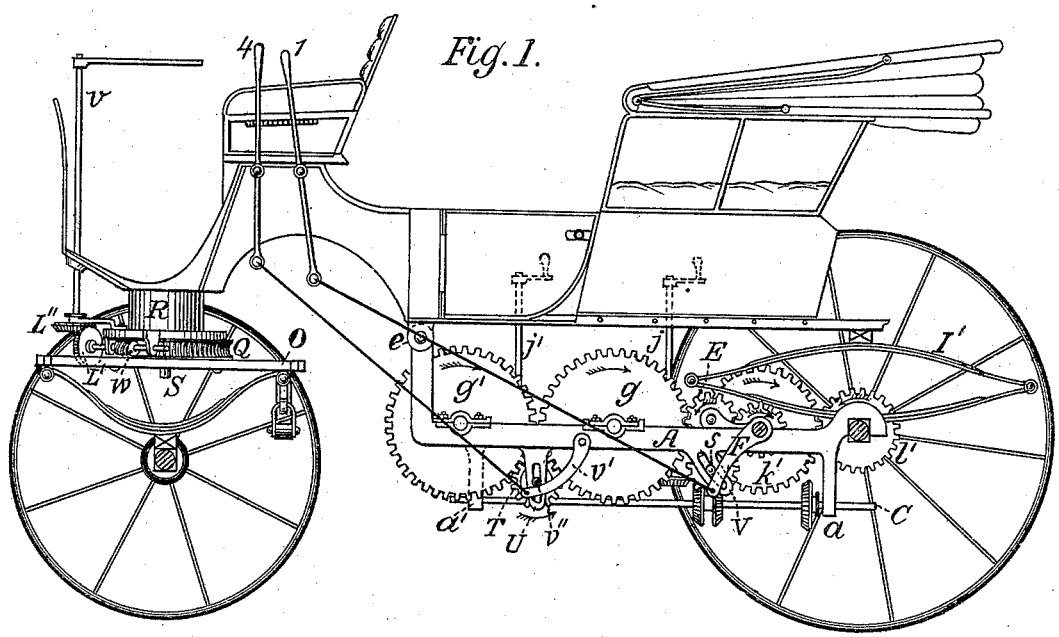
Figure 2:
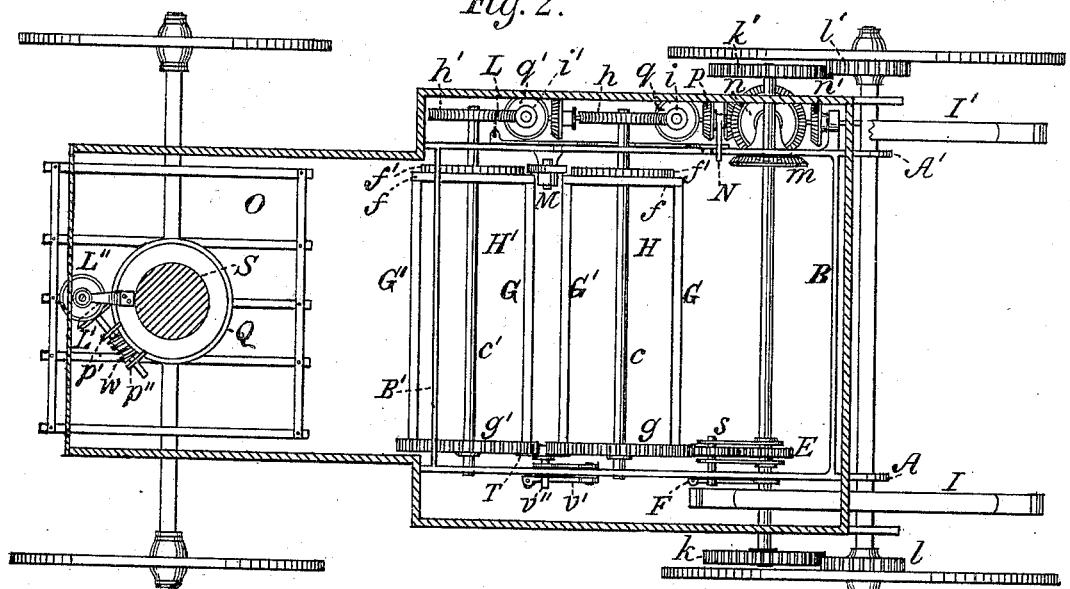
Figure 16:
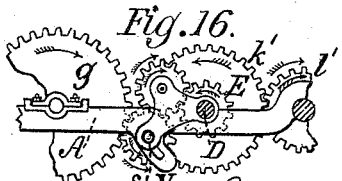
Figure 3:
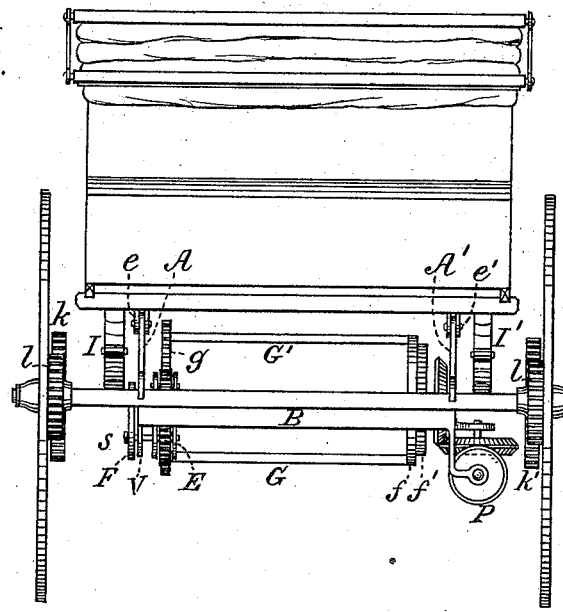
Figure 8:
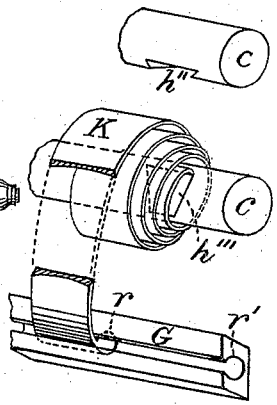
Figure 4:
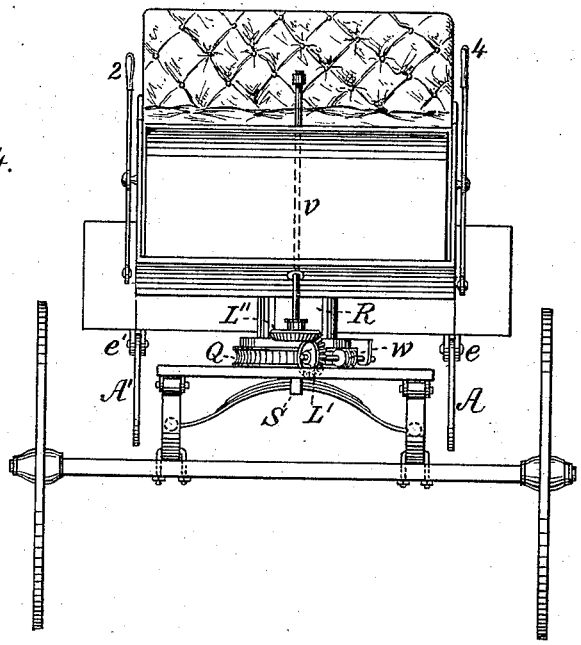
Figure 9:
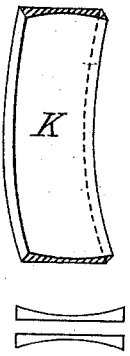

Referring to the accompanying drawings, Figure 1 exhibits a front elevation of the apparatus on its supporting-frame, the same connected to a carriage, the front wheels of the latter being removed. Fig. 2 is a top view of the foregoing figure, showing the reel of the springs and the arrangement of mechanical parts. Fig. 3 shows the rear end of the vehicle, with the frame of the apparatus connected; and Fig. 4 represents the front end of the same, with the steering apparatus. Fig. 5 is a longitudinal section through the center, showing the mechanism of the apparatus in working order. Figs. 6 and 7 represent in detail, on enlarged scale, front and end views of the brake, as constructed and connected with the ratcheted disks on the end of the reels. Fig. 8 shows in detail the spring and its respective ends as connected to the shaft and cross-beam of the reel. Fig. 9 shows a portion of the spring-plate proper in enlarged view, and its plano-concave shape changed from one side to opposite one. Figs. 10 and 11 represent the winding arrangement in connection with beveled gear on their respective shafts in the required positions. Figs. 12 and 13 represent the movements of the shifting-lever and the extreme positions of the handle. Fig. 14 explains the movement of the handle attached to the sleeve of the twin-beveled wheel, according to the movements of the sliding lever. Fig. 15 shows the sliding lever as constructed and in the act of lifting the handle. Fig. 16 represents in detail a combination-gear attached to the driven shaft, for a forward or reversed movement of the vehicle.

The apparatus for propelling light-running vehicles rests on an iron frame composed of side pieces, A A', the same held rigidly together by brace-bars B B', and provided with supports for securing the shafts and spindles of the machinery. The side piece, A', has in addition two downward projecting hangers, $a$ $a'$, of equal length for carrying a sliding shaft, C, and is further provided with a recessed space, $b$, the same having a notch, $b'$, in its center, and with slotted guide-holes $b''$ $b'''$, corresponding in length with the space of the above-said recess. The front ends of the two side pieces, A A', are turned up, the latter, A', projecting into a short arm $o$, supporting a lever, $p$. Said side pieces are pivoted to hinges $e$ $e'$ on the bottom of the vehicle, while the rear ends are bended upon the axle of the driving-wheels and secured in their position, which arrangement permits a swinging motion of the frame imparted from the movements of the vehicle without molesting the apparatus, and the prevailing stress is relieved by the mainsprings I I', connecting the axle of the hind wheels with the cross-bar of the body.

The motive power for locomotion is derived from a series of steel springs of peculiar construction, hereinafter described, wound upon the shafts $c$ $c'$, the same being connected to reels H H', having each at their rear end ratcheted mounted disks $f$ $f'$, and spur-wheels $g$ $g'$ in front, the reels revolving loosely on their respective shafts on the supporting-frame, for the purpose of giving vent to the centrifugal force of the expanding springs.

The spring-plate K, as represented in three views, Fig. 9, and adapted in the apparatus, is of plano-concave-shaped surface for the purpose of distributing and preserving its power equally sidewise, and having the strength of both sides combined, when required, in the display of force. By the aid of the weak part in the middle the spring is enabled to cave opposite and assume its shape, but in reversed condition between its two extreme ends during the operation of winding, so that both sides of its end fastenings lie flat, the upper end against the cross-beam G of the reels and the lower or inner end against the shaft $c$ of the same, as shown in Fig. 8 of the drawings. The same shows, also, the mode of fastening of the inner spring end to the shaft, and the latter is for the object provided with a dove-tailed inclined and converging recess, $h''$, on its face, into which the similar shaped and bended end $h'''$ of the spring passes and is secured there in position, while the other or upper end of the same terminates in a solid cylindrical head, $r$, which is slipped in the laterally-running fitting groove $r'$ on the cross-beams of the reel. On the rear end of the reel-shafts are worm-wheels $h\ h'$, gearing with worms $i\ i'$ on upright spindles $j\ j'$. The same are provided each with a bevel-gear, $g\ g'$, at their lower end, and by operating the worm-gear revolves the shafts $c\ c'$, accomplishing the process of winding up the springs either by hand (alternately one or the other series of the same) or by the application of power derived from locomotion.

D is a driven shaft, connected to the frame at the rear portion, and its function is to transmit, with its adjustments, the motive power of the springs to the traction-wheels for propelling the same, and is also instrumental in the winding-up process, when required, by power. The same is equipped with a combination-gear, E, beveled driven gear $m$, and on both of its extreme ends with gear-wheels $k\ k'$, engaging there the spur-wheels $l\ l'$, fastened upon the hubs of the traction-wheels. The combination-gear E is in front of spur-gear $g$, and composed of three equal-sized pinions held together in position inside a suitable frame which is loosely fitting on the driven shaft. One of the pinions is firmly secured to said shaft D, and the remaining ones in contact with each other and alternately thrown into gear with the aforesaid spur-wheel $g$, as desired, either for a forward or reversed motion of the vehicle by the up or down movement of the curved arm F, extending from the driven shaft, and operating the pin $s$ of the lower pinion, in a segmental slotted supporting-hanger, V, on the side piece, A, of the frame, said arm being dependent on the workings of the connecting-rod of lever 1 from the front seat of the operator. The beveled wheel $m$ is engaged with the double bevel-gear $n$, which communicates its rotary motion to the sliding shaft C at right angles by an intermittent gear, $n'$. The shaft C is in connection with the frame of the apparatus, and supported by hangers $a\ a'$, loosely sliding in the same in a horizontal direction back or forward, caused by the movements of a shifting-lever, L. The shaft C has mounted near its end portions beveled wheels $n'\ n''$, and between the bevel-gear $q$ and double bevel-gear $n$ a twin bevel-wheel, P, on a sleeve which is provided with a handle, N. The foregoing gear-wheels are securely fastened to the shaft C and subjected to the movements of the same. Said shifting-lever L is connected to the frame-piece A', and supported in position by studs $s'\ s'$ projecting through the slotted holes $b''\ b'''$, beneath the recessed space $b$ on the frame, for the purpose of operating the handle N. To accomplish this fact, the middle portion of the shifting-lever is raised in two separating parts, $t\ t'$, with inclined sides $o'\ o''$, of corresponding angles, provided at their upper ends with projecting shoulders $u\ u'$, and terminating at the lower ends in an even recess, $t''$, which is on a level with the base of the afore-described notch $b'$, in center of a recessed part on the frame. When operated back or forward by the connected hand-lever 2 from the seat of the operator, the shifting-lever moves accordingly, and one of the inclined sides passes underneath the handle N, dislodging the same gradually, and one or the other of the shoulders $u\ u'$ in contact forces the handle to slide on the recessed part $b$ of the frame toward one end, carrying in its movement the connected shaft C, and its contrivances, in the desired direction of the proposed gearing.

The brake M is a double-acting one, and consists of two corresponding segmental sections, $d\ d'$, pivoted in center to the frame-piece A' in the space between the two ratcheted disks $f\ f'$ of the reels recessed and fitted one into the other in reversed positions by traversing one lower part with the other upper one, so as to throw the ratcheted sections $d'\ d'$ in contact with the ratcheted-wheels $f'\ f'$ and the friction-clutches $d\ d$ with the disks $f\ f$ of the reels accordingly as the same are required for action.

The ratcheted sections are provided with lugs at their ends, to be hooked with connecting-rods, the same being adjusted to a parallel motion, connected to and worked by hand-lever No. 3, which is attached to one side of the seat for convenience in working the same.

The steering apparatus is situated in front of the vehicle, and consists of a horizontal square-built frame, O, supported by springs underneath, sidewise, and in the rear. The side springs are fastened to the axle of the front wheels in a secure manner, the rear spring resting with its ends on the side springs for balancing with the same the bearing weight of the square steering-frame O and worm-wheel Q bolted to the same. The flanged collar-block R is fixed on the bottom of the seat, and bears the king-bolt S in center, and turns on the upper part of the worm-wheel, with the downward-extending bolt through the same. Said flange of the collar-block is of circular shape, and carries on the ream two sidewise-projecting hangers, $p'$ $p''$, for supporting the shaft, with worm $w$, in tangent position to the worm-wheel Q, which latter is operated by a beveled gear, L' L'', on the end of the worm-shaft, connecting it with the upright post or spindle $v$, which is mounted on top with a handle or steering-wheel for working the gear on the worm-shaft, causing the front wheels of the vehicle to turn with the axle around the king-bolt.

The springs are wound up for storing power, first by hand, which is performed by throwing the intermittent gear T out of gear with the connecting spur-wheels $g$ $g'$, which is done by operating the hand-lever No. 4, working the arm $v'$, and with the same the pin $v''$ of the intermittent-gear, and playing in the slotted hanger U on frame-piece A. The worm-gear $i$ $i'$ is set in action by turning the spindles $j$ $j'$, which will revolve the worm-wheels $h$ $h'$, and consequently the shafts $c$ $c'$, to which these are attached, causing the whole line of the springs to coil each tightly around the same. Meanwhile the brake M is thrown into contact with the ratcheted wheels $f'$ $f'$ of the reels, to prevent the same from unwinding until required.

In transmitting the accumulated power of the spring-motor to the traction-wheels for motion, the intermittent gear T is thrown into connection with the spur-wheels $g$ $g'$, the ratcheted sections $d'$ $d'$ of the brake are withdrawn, and the friction-clutches $d$ $d$ of the same applied to the disks $f$ $f$. The stored power manifests itself now by the expanding force of the unwinding spring-plates, resulting in revolving the reels and the connected line of gears in the direction toward the traction-wheels. At this juncture the combination-gear E on the driven shaft D is thrown into connection with the reel-gear $g$, causing the driven shaft to revolve either forward or reversed, according as the upper or lower pinion is engaged. The revolving motion of the driven shaft is thus transmitted to the hind or traction wheels of the vehicle for propelling the same, and by the aid of the steering apparatus any angle of radial direction can be run.

In using the stored-up power of the springs from one or the other of the reels, as described, in winding up the same, one reel at a time is operated upon only, as the stored power of one is required to be transmitted to the other, which is partially exhausted in power by imparting motion to the traction-wheels, and is accomplished during the forward motion of the vehicle principally by the bevel-gear $m$, fastened and revolving with the driven shaft D, and, in connection with two others—one the horizontal double-beveled wheel $n$ and the other vertical gear $n'$ on shaft C—causes the latter to revolve and operates with it on same fixed bevel-gear $n''$ and twin gear P alternately, as required, the connecting beveled wheels $q$ or $q'$ attached to the spindle of the worms, which gears each with its connecting worm-wheel fastened to the shaft of the reel selected for receiving the power, and in turning said shaft winds up its carrying-springs until sufficient power is acquired. During this process the friction-clutches of the brake M are applied to the disks of the reels, controlling the same as if applied for regulating the speed.

I claim—

1. In an apparatus for locomotive light-running vehicles, a supporting iron frame to be attached to the body, consisting of two side pieces, A A', the same having their front ends turned up and pivoted to hinges $e$ $e'$ on the body of the vehicle, and the rear ends firmly secured to the axle of the driving-wheels and rigidly held in position by brace-bars B B', the side piece A' having near the pivoted end a projecting arm, $o$, and further provided with a recessed space, $b$, with a notch, $b'$, slotted guide-holes $b''$ $b'''$, and supporting-hangers $a$ $a'$, the other side piece, A, being provided with slotted supports U V, substantially as described, and for the purpose specified.

2. In combination with the attachable frame of an apparatus for locomotive vehicles, the reels H H', having ratcheted mounted disks $f$ $f'$ on one side and spur-wheels $g$ $g'$ on the opposite side, connected together by cross-beams G G', the same having lateral grooves $r'$, the reels being connected to shafts $c$ $c'$, the same having a dovetailed inclined recess, $h''$, and mounted at their extreme ends with worm-wheels $h$ $h'$, substantially as described, and for the purpose specified.

3. In combination with an apparatus for locomotion, supported by an attachable iron frame to vehicles, the reels H H' on shafts $c$ $c'$, the same in connection with coiled steel springs mounted and wound in rows inside the periphery of said constructed reels, the springs being constructed of steel plates K, representing a plano-concave surface capable of changing its shape, as described, the inner end, $h'''$, tapered and the outer end terminating into a head, $r$, of cylindrical form, substantially as described, and for the purpose specified.

4. In combination with the attachable frame for vehicles, supporting an apparatus for locomotion, the reels H H', in connection with coiled spring-plates K, and the double-acting brake M, consisting of two segmental shaped sections, $d$ $d'$, the same being recessed in center and traversing each other, and pivoted to the frame of the apparatus, substantially as described, and for the purpose specified.

5. In combination with the reels H H', the intermittent gear T and combination-gear E, the latter secured to driven shaft D, and in connection with said shaft the arrangement of a gearing for winding up the springs for locomotion, consisting of bevel-wheel $m$, and double beveled gear $n$, the same being in contact alternately with bevel-wheel $n'$ and twin bevel-gear P, the same provided with a handle, N, and secured to a sliding shaft, C, all combined and arranged on a supporting-frame attachable to the body of a vehicle, substantially as described, and for the purpose specified.

6. The shifting-lever L, with separating parts $t\ t'$, the same having shoulders $u\ u'$ and inclined sides $o'\ o''$ projecting toward a recessed part, $t''$, in middle, for the purpose described, in combination with a twin beveled gear, P, having a handle, N, and sliding shaft C on a frame, substantially as described, and for the purpose specified.

7. In an apparatus or a spring-motor for propelling vehicles, having an attachable frame for supporting the same, the combination of a steering apparatus consisting of beveled gears $L'\ L''$, worm-wheel Q on a platform, operated by a tangent worm-gear, $w$, the same supported by hangers $p'\ p''$ on a flanged collar-block, R, and the arrangement of hand-levers Nos. 1 2 3 4, to operate certain connected mechanical parts, as specified, all constructed, combined, and arranged as described, and for the purpose set forth.

In testimony whereof I have hereunto set my hand in the presence of two subscribing witnesses.

RICHARD HARRISON GARLAND.

Witnesses:
 ALFRED A. LEHMANN,
 EDWIN WILDE.